Patented Apr. 12, 1949

2,467,126

UNITED STATES PATENT OFFICE 2,467,126

PRODUCTION OF MONO-ALKYL ESTERS OF THE ADDITION PRODUCT OF LEVO-PIMARIC ACID WITH MALEIC ANHYDRIDE

Morris M. Graff, New Orleans, La., assignor to the United States of America as represented by the Secretary of Agriculture No Drawing. Application February 24, 1947, Serial No. 730,576

3 Claims. (Cl. 260—103)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the production of certain esters herein named mono-alkyl esters of the addition product of levo-pimaric acid with maleic anhydride. Alkali metal salts of these esters are easily produced and are useful as emulsifying and modifying agents in the polymerization of monomers, such as butadiene, styrene, isoprene, myrcene, and so forth, as more fully set forth in the patent applications of McKennon, Serial No. 703,973, filed October 18, 1946, and of Lawrence, Serial No. 703,975, filed October 18, 1946.

Copending application, Serial No. 729,677, filed Feb. 20, 1947, discloses formation of a compound therein named mono-acid halide of the addition product of levo-pimaric acid with maleic anhydride, which according to the disclosure of that application is produced in general by reacting a compound known as the addition product of levo-pimaric acid with maleic anhydride with a halogenating agent, including the inorganic halides PCl$_3$, PCl$_5$, PBr$_3$, PBr$_5$, and SOCl$_2$, PCl$_3$ being preferred, and separating the produced mono-acid halide from the reaction mass in substantially pure form. The resulting compound of that application is indicated as having the structural formula:

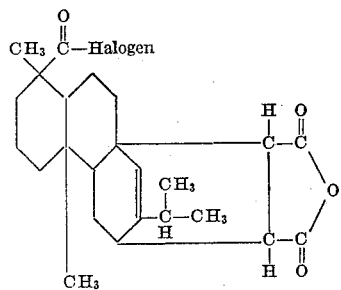

in which the halogen indicated in the formula is Cl or Br corresponding to that of the reacting halogenating agent.

This compound is used as an intermediate in the production of the compounds of the present invention.

In general, according to the present invention, the mono-acid halide of the addition product of levo-pimaric acid with maleic anhydride is heated with a lower aliphatic monohydric alcohol under anhydrous conditions. In this reaction, the halogen of the addition product is replaced by an alkoxy group resulting in a compound which may be represented by the structural formula:

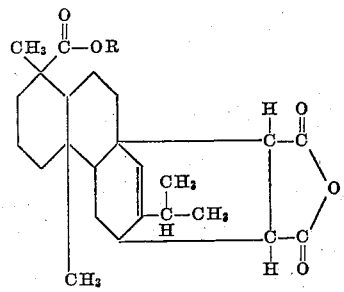

where R is a lower alkyl group.

Preferably, the mono-acid chloride of the addition product of levo-pimaric acid with maleic anhydride is used as the intermediate and is heated with an excess of the lower aliphatic monohydric alcohol by refluxing the mono-acid chloride and the alcohol. The time of reaction is not critical, but from one to two hours is preferred for good yields. The excess of the alcohol may vary over wide limits, 1.1 to 10 moles of alcohol per mole of the mono-acid chloride being satisfactory.

After the reaction is completed, the excess alcohol may be distilled off and the residue extracted with an inert solvent, such as diethyl ether, for example. The ether solution may be washed with water until neutral to remove formed HCl, and then evaporated. The desired monoester of the addition product crystallizes out and may be recovered in nearly a quantitative yield and substantially pure.

Although the procedure indicated above for formation of the mono-alkyl esters is preferred, these esters may also be produced by heating the addition product of levo-pimaric acid with maleic anhydride with a lower aliphatic monohydric alcohol under anhydrous conditions in the presence of an esterification catalyst such as sulfuric acid, although the yields are not as high as when the mono-acid chloride is used.

The following examples will exhibit the invention in greater detail, Examples I-IV showing the process using the mono-acid chloride.

EXAMPLE I

*Production of mono-methyl ester of the addition product of levo-pimaric acid with maleic anhydride*

15.0 grams (0.0358 mole) of the mono-acid chloride of the addition product of levo-pimaric acid with maleic anhydride (prepared by reacting the addition product of levo-pimaric acid with maleic anhydride with an excess of $PCl_3$, as described in my copending application mentioned above), was mixed with 100 ml. (2.5 moles) of anhydrous methyl alcohol, and refluxed for two hours.

Following the refluxing, approximately 75 ml. of the unreacted alcohol was distilled off. The residue was extracted with diethyl ether, and the ether solution was shaken with successive portions of distilled water until neutral to litmus. It was then dried over anhydrous sodium sulfate and evaporated to dryness. The residue crystallized on moistening with a little ethyl alcohol.

The yield of the product was 14.7 gm. (99.05% of theory) and after recrystallization it melted at 216°–217° C.

A sample of this product showed no depression in the melting point when mixed with known mono-methyl ester of the addition product of levo-pimaric acid with maleic anhydride, which had been prepared by reacting methyl-abietate with maleic anhydride. This establishes the structure of the compound as the mono-methyl ester of the addition product and shows that there was no esterification at the anhydride configuration.

EXAMPLE II

*Production of the mono-ethyl ester of the addition product of levo-pimaric acid with maleic anhydride*

15 grams of the mono-acid chloride (0.0358 mole) was mixed with 100 ml. of absolute ethyl alcohol (1.6 mole), and the mixture refluxed for two hours, as in Example I.

75 ml. of the alcohol was distilled off and the residue was extracted with ether. (Crystals started to form in the ether.) The ether extract was washed with distilled water until neutral to litmus, dried over $Na_2SO_4$ and evaporated to dryness. Crystals formed in the viscous residue.

The yield of the product was 15.0 gm. (97.7% of theory).

The product was recrystallized from ethyl alcohol and showed a melting point of 154.5°–155.5° C.

A sample of this product mixed with known mono-ethyl ester of the addition product of levo-pimaric acid with maleic anhydride showed no depression in melting point.

EXAMPLE III

*Production of mono-propyl ester of the addition product of levo-pimaric acid with maleic anhydride*

15 grams of the mono-acid chloride (0.0358 mole) was mixed with 8.5 ml. of anhydrous n-propyl alcohol (0.36 mole) and the mixture refluxed for 1¾ hours.

The reaction mixture was then cooled and suction was applied to remove HCl and unreacted alcohol. The residue was extracted with ether. The ether extract was washed with distilled water until neutral to litmus, dried over $Na_2SO_4$ and evaporated to dryness.

The yield of the product was 15.6 gm. (98.4% of theory).

The residue was recrystallized from ethyl alcohol and showed a melting point of 146°–147° C.

EXAMPLE IV

*Production of mono-butyl ester of the addition product of levo-pimaric acid with maleic anhydride*

15 grams of the mono-acid chloride (0.0358 mole) and 3.27 ml. of anhydrous n-butyl alcohol (0.0357 mole) were mixed and melted together at a temperature of 140°–150° C. for one hour.

The mixture was cooled and extracted with ether. The ether was washed with distilled water until neutral to litmus, dried over $Na_2SO_4$ and evaporated to dryness. The residue crystallized on wetting with ethyl alcohol.

The yield of the product was 13.9 gm. (82% of theory). After recrystallization the product melted at 144.5°–145.5° C.

The following examples exhibit the invention using the addition product of levo-pimaric acid with maleic anhydride as the intermediate.

EXAMPLE V

*Production of mono-ethyl ester of the addition product of levo-pimaric acid with maleic anhydride*

A mixture of 50 gm. (0.125 mole) of the addition product of levo-pimaric acid with maleic anhydride and 500 ml. (8.5 moles) of absolute ethyl alcohol containing 3% sulfuric acid by weight was refluxed at atmospheric pressure for 10 hours.

Substantially all of the excess alcohol was then distilled off and the residue was extracted with ethyl ether. The ether solution was washed with successive portions of distilled water until neutral to litmus, dried over anhydrous sodium sulfate and evaporated to dryness.

The residue was recrystallized and showed a melting point of 154.5°–155.5° C. The yield of the product was 4 gm. (7.5% of theory).

EXAMPLE VI

*Production of mono-ethyl ester of the addition product of levo-pimaric acid with maleic anhydride*

A mixture of 5 gm. (0.0125 mole) of the addition product of levo-pimaric acid with maleic anhydride and 50 ml. (0.85 mole) of absolute ethyl alcohol containing 3% by weight of sulfuric acid was placed in a glass liner in a steel bomb. The temperature was raised to 250° C., and maintained at that temperature for two hours. During this heating period, a maximum pressure of 750 pounds per square inch was developed.

After cooling, the bomb was opened and the reaction mixture was extracted with ethyl ether. The ether solution was washed with distilled water until neutral to litmus. A small amount of the produced ester crystallized out of the ether and after recrystallizing from ethyl alcohol it melted at 155°–156° C.

The processes of Examples V and VI were also used for the preparation of the mono-methyl, mono-n-propyl, and mono-n-butyl esters of the addition product of levo-pimaric acid with maleic anhydride, but the yields were lower than those obtained in Examples V and VI.

Having thus described the invention, what is claimed is:

1. A process comprising heating a substantially pure mono-acid halide of the addition product of levo-pimaric acid with maleic anhydride, wherein the halogen of the halide is selected from the class consisting of Cl and Br, with a lower aliphatic monohydric alcohol under anhydrous conditions, and recovering the formed mono-alkyl ester of the addition product of levo-pimaric acid with maleic anhydride from the reaction products.

2. The process of claim 1, wherein an excess of the lower aliphatic monohydric alcohol is used.

3. A process comprising refluxing a mixture of substantially pure mono-acid chloride of the addition product of levo-pimaric amid with maleic anhydride and an excess of a lower aliphatic monohydric alcohol under anhydrous conditions, distilling off unreacted alcohol, and recovering the formed mono-alkyl ester of the addition product of levo-pimaric acid with maleic anhydride from the residue.

MORRIS M. GRAFF.

REFERENCES CITED

The following references are of record in the file of this patent:

UNITED STATES PATENTS

| Number | Name | Date |
| --- | --- | --- |
| 2,077,371 | Rheineck | Apr. 13, 1937 |
| 2,359,980 | Fleck | Oct. 10, 1944 |
| 2,367,380 | Spiller | Jan. 16, 1945 |
| 2,409,930 | Cox | Oct. 22, 1946 |